United States Patent
Perry

(10) Patent No.: US 9,816,491 B2
(45) Date of Patent: Nov. 14, 2017

(54) SOLAR POWER SYSTEM AND METHOD THEREFOR

(75) Inventor: Michael L. Perry, Glastonbury, CT (US)

(73) Assignee: SOLARRESERVE TECHNOLOGY, LLC, Santa Monica, CA (US)

( * ) Notice: Subject to any disclaimer, the term of this patent is extended or adjusted under 35 U.S.C. 154(b) by 42 days.

(21) Appl. No.: 13/248,395

(22) Filed: Sep. 29, 2011

(65) Prior Publication Data

US 2013/0081394 A1    Apr. 4, 2013

(51) Int. Cl.
| | | |
|---|---|---|
| F03G 6/00 | (2006.01) | |
| F03G 6/06 | (2006.01) | |
| F22B 1/00 | (2006.01) | |
| F22B 1/02 | (2006.01) | |
| F28D 20/00 | (2006.01) | |
| H02J 3/38 | (2006.01) | |
| F01K 7/22 | (2006.01) | |

(52) U.S. Cl.
CPC ............... *F03G 6/067* (2013.01); *F01K 7/22* (2013.01); *F03G 6/005* (2013.01); *F22B 1/006* (2013.01); *F22B 1/028* (2013.01); *F28D 20/00* (2013.01); *H02J 3/383* (2013.01); *F28D 2020/0047* (2013.01); *Y02E 10/46* (2013.01); *Y02E 10/563* (2013.01); *Y02E 60/142* (2013.01); *Y02E 70/30* (2013.01)

(58) Field of Classification Search
CPC ................ Y02B 10/20; F24J 2/48; F22B 1/00
USPC ........................................................ 60/641.8
See application file for complete search history.

(56) References Cited

U.S. PATENT DOCUMENTS 4,055,948 A * 11/1977 Kraus ..................... F03G 6/067
                                                                126/573
4,205,656 A    6/1980 Scarlata
(Continued)

FOREIGN PATENT DOCUMENTS

WO    WO 2008105913 A2 *  9/2008
WO       2014/052927 A1    4/2014
(Continued)

OTHER PUBLICATIONS

Matthew L. Wald, Apr. 21, 2014, "Ice or Molten Salt, Not Batteries, to Store Energy," downloaded from http://www.nytimes.com/2014/04/22/business/energy-environment/ice-or-molten-salt-not-batteries-to-store-energy.html?_r=0, 4 pages.
(Continued)

*Primary Examiner* — Mark Laurenzi
*Assistant Examiner* — Shafiq Mian
(74) *Attorney, Agent, or Firm* — Kagan Binder, PLLC

(57) ABSTRACT

A solar power system includes a solar energy collector that has at least one solar receiver that is operable to carry a working fluid and at least one solar reflector that is operable to direct solar energy towards the at least one solar receiver to heat the working fluid. The working fluid has a maximum predefined operational temperature up to which it can be heated. A first storage unit is connected to receive the working fluid from the at least one solar receiver, and a second storage unit is connected to provide the working fluid to the at least one solar receiver. A power block generates electricity using heat from the heated working fluid. A heater is operable to heat the working fluid to approximately the maximum predefined operational temperature.

6 Claims, 2 Drawing Sheets

(56) References Cited

U.S. PATENT DOCUMENTS

| | | | |
|---|---|---|---|
| 4,248,291 A | 2/1981 | Jarmul | |
| 4,394,814 A * | 7/1983 | Wardman | F03G 6/06 126/561 |
| 4,438,630 A * | 3/1984 | Rowe | F01K 3/18 60/641.8 |
| 5,384,489 A * | 1/1995 | Bellac | F22B 1/06 290/44 |
| 6,494,042 B2 | 12/2002 | Bronicki | |
| 6,701,711 B1 * | 3/2004 | Litwin | F02C 1/05 60/641.11 |
| 6,957,536 B2 * | 10/2005 | Litwin | F03G 6/064 60/641.11 |
| 7,296,410 B2 | 11/2007 | Litwin | |
| 7,340,899 B1 * | 3/2008 | Rubak | F03G 6/003 60/641.2 |
| 8,327,641 B2 * | 12/2012 | Freund | F01K 23/10 60/641.8 |
| 2004/0099261 A1 * | 5/2004 | Litwin | F24J 2/07 126/638 |
| 2004/0148922 A1 * | 8/2004 | Pinkerton | F02C 1/05 60/39.6 |
| 2005/0126560 A1 * | 6/2005 | Litwin | F24J 2/085 126/683 |
| 2006/0179840 A1 * | 8/2006 | Murphy | F24J 2/07 60/641.8 |
| 2007/0157614 A1 * | 7/2007 | Goldman | F02C 3/22 60/641.15 |
| 2008/0000231 A1 * | 1/2008 | Litwin | F03G 6/06 60/641.11 |
| 2009/0211249 A1 * | 8/2009 | Wohrer | F01K 3/00 60/641.8 |
| 2010/0175687 A1 * | 7/2010 | Zillmer et al. | 126/619 |
| 2010/0236239 A1 * | 9/2010 | Kroizer et al. | 60/641.8 |
| 2010/0300096 A1 | 12/2010 | Gandhi | |
| 2010/0301062 A1 * | 12/2010 | Litwin | F24J 2/34 220/734 |
| 2011/0016864 A1 | 1/2011 | Wright et al. | |
| 2012/0241122 A1 | 9/2012 | Xiang et al. | |
| 2013/0049368 A1 | 2/2013 | Kaufmann et al. | |
| 2013/0056169 A1 | 3/2013 | Stiesdal et al. | |
| 2013/0292084 A1 * | 11/2013 | Luz | F28D 20/00 165/10 |
| 2014/0182576 A1 | 7/2014 | Harats et al. | |
| 2017/0075939 A1 * | 3/2017 | Biewald | G06F 17/30362 |

FOREIGN PATENT DOCUMENTS

| | | |
|---|---|---|
| WO | 2014/174373 A2 | 10/2014 |
| WO | 2014/176290 A2 | 10/2014 |

OTHER PUBLICATIONS

Aug. 28, 2015, "Low-Cost Molten Salt Energy Storage Solution Wins Eureka Prize,", downloaded from https://cleantechnica.com/2015/08/28/low-cost-molten-salt-energy-storage-solution-wins-eureka-prize/, 8 pages.

Kevin Bullis, Feb. 27, 2014, "Molten Salts Might Provide Half-Price Grid Energy Storage,", downloaded from https://www.technologyreview.com/s/525121/molten-salts-might-provide-half-price-grid-energy-storage/, 4 pages.

* cited by examiner

HEAT A WORKING FLUID USING A SOLAR ENERGY INPUT THAT FLUCTUATES SUCH THAT WORKING FLUID TEMPERATURE FLUCTUATES —62

SELECTIVELY ELECTRICALLY HEAT WORKING FLUID IN RESPONSE TO BEING BELOW PREDETERMINED THRESHOLD TEMPERATURE —64

60

SOLAR POWER SYSTEM AND METHOD THEREFOR

BACKGROUND

This disclosure relates to power plants for generating electricity.

Solar power plants for capturing solar energy and generating electricity are known and used. For instance, a solar collector system may direct solar energy into a heat-absorbing fluid, such as a molten salt or a synthetic oil. The heated fluid is used to generate electrical power using a thermodynamic cycle, such as producing steam to drive a turbine to generate electricity. The heat-absorbing fluid may be stored in or circulated through one or more tanks. Since the energy collected in such solar thermal power plants can be stored, the power output is more dispatchable than solar power devices that do not include any means of energy storage, such as photovoltaic cells.

BRIEF DESCRIPTION OF THE DRAWINGS

The various features and advantages of the disclosed examples will become apparent to those skilled in the art from the following detailed description. The drawings that accompany the detailed description can be briefly described as follows.

DETAILED DESCRIPTION OF THE PREFERRED EMBODIMENT

Figures 1, 2:
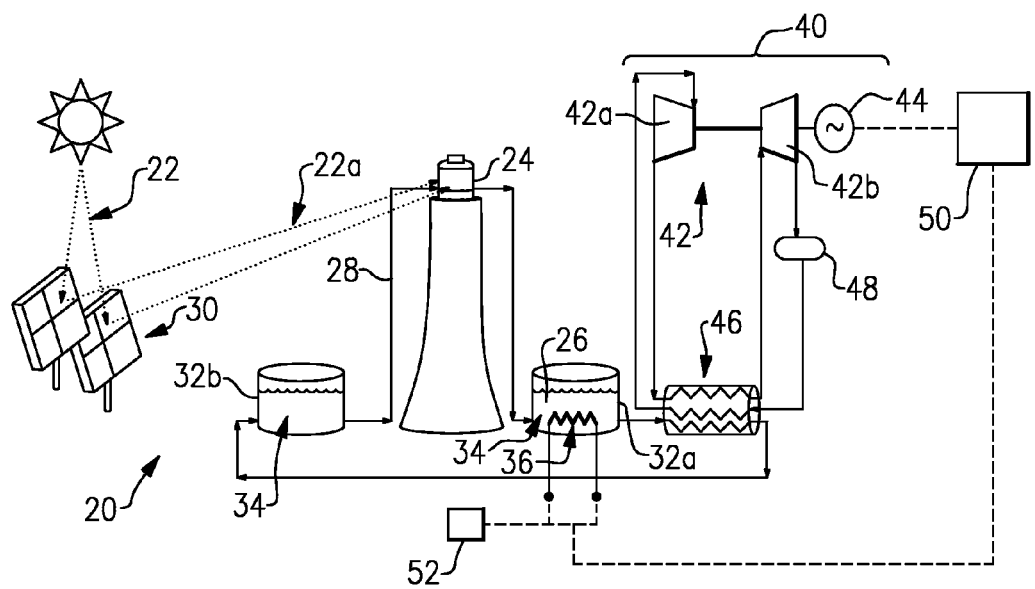
FIG. 1 shows an example solar power system having a heater.
FIG. 2 shows an example method for use with a solar power system.

FIG. 1 illustrates selected portions of an example solar power system 20 for capturing and using solar energy or incidence 22. Although selected components of the solar power system 20 are shown in this example, it is to be understood that additional components may be utilized with the solar power system 20 to generate electricity. As will be described in further detail, the disclosed solar power system 20 includes features for controlling electric output, such as to ensure a predictable electrical output, even if the solar energy 22 is poor over a substantial period of time. For instance, the total energy and power available from solar thermal power plants can vary due to solar energy fluctuations. Thus, there exists a need to improve the total energy and power output of solar thermal power plants that reduces or eliminates the need for an expensive reserve power plant.

The solar power system 20 includes at least one solar receiver 24 through which a working fluid 26 can be circulated. The working fluid 26 has a maximum predefined operational temperature. For instance, the maximum predefined operational temperature can be defined based on a breakdown temperature of the working fluid 26 or system 20 and/or the temperature to which the working fluid 26 is heated to maximize electrical output from the system 20, or a combination of these factors and/or other factors.

If the solar energy 22 is strong, the working fluid 26 is heated to approximately the maximum predefined operational temperature, which in turn produces approximately the maximum electrical output from the system 20. However, if the solar energy 22 is intermediate or poor, the working fluid 26 is not heated to the maximum predefined operational temperature, which results in less electrical output from the system 20. Thus, the electrical output fluctuates in accordance with the strength of the solar energy 22.

The fluctuation is at least partially mitigated by the thermal capacity of the working fluid 26. For instance, the working fluid 26 has the ability to retain thermal energy from the solar energy 22 for some amount of time that depends on the fluid selected and storage conditions. However, if the solar energy 22 remains intermediate or poor over a period of time that is greater than the thermal storage capacity of the working fluid 26, the electrical output undesirably fluctuates to a greater degree. The system 20 and operation as described below reduce the fluctuation and ensure a predictable electrical output.

The working fluid 26 is circulated through lines 28 or other suitable conduits for handling the particular type of working fluid 26. In one example, the working fluid 26 is a molten salt, such as potassium nitrite and sodium nitrite. However, depending upon the type of system used, the working fluid 26 may alternatively be another type, such as a liquid metal or a fluoride salt or a hydrocarbon such as a synthetic oil. Given this description, one of ordinary skill in the art will recognize suitable working fluids 26 to meet their particular needs.

The solar power system 20 includes at least one solar collector 30 that is operative to direct the solar energy 22 toward the solar receiver 24 via reflected and/or concentrated rays 22a to heat the working fluid 26 in a known manner. As an example, the solar collector 30 includes one or more heliostats for tracking and following the sun.

As an alternative to the centralized receiver 24 or "tower" collector shown in FIG. 1, the solar receiver 24 may include a trough-type solar collectors or other types of solar collectors that are known for receiving the solar energy 22 and transferring heat to the working fluid 26. It is to be understood that the solar power system 20 may be modified from the illustrated example and include other types of solar collectors 30 and solar receivers 24.

The solar power system 20 further includes a first storage unit 32a and a second storage unit 32b. Each of the units 32a and 32b, which in some example can include a multiple of such units, includes an internal volume 34 for holding or circulating the working fluid 26. In this example, the first storage unit 32a is a "hot" storage unit that is connected to receive the working fluid 26 from the solar receiver 24, and the second storage unit 32b is a "cold" storage unit that is connected to provide the working fluid 26 to the solar receiver 24.

A supplemental heat source 36 is operable to heat the working fluid 26 to approximately the maximum predefined operational temperature. In one example, the supplemental heat source 36 is an electric resistance heater that is suitably sized to heat the working fluid 26 to approximately the maximum predefined operational temperature. The supplemental heat source 36 can also have one or more ceramic heating elements that are capable of withstanding the temperature and chemical conditions within the working fluid 26. As shown, the supplemental heat source 36 is located within the first storage unit 32a. In other examples, the supplemental heat source 36 is located elsewhere in the system 20, such as in the lines 28.

A power block is generally shown at 40 and is operable to generate electricity in a thermodynamic cycle using heat from the heated working fluid 26. In the illustrated example, the power block 40 includes a turbine 42 having a high pressure section 42a and a low pressure section 42b, an electric generator 44 that is coupled to be driven by the turbine 42, and a heat exchanger 46 for thermal exchange between the working fluid 26 and a second working fluid (e.g., water) that drives the turbine 42. A condenser 48 is located between the low pressure turbine section 42b and the heat exchanger 46. The generator 44 is electrically connected with an electric grid 50. It is to be understood that the disclosed power block 40 is an example and that other power block configurations can alternatively be used to generate electric output from the thermal energy contained in the working fluid 26.

A controller 52 is connected with the supplemental heat source 36 to selectively augment heating of the working fluid 26. The controller 52 can also be connected with other components in the system 20. In embodiments, the controller includes hardware, software or both. For example, the controller 52 includes a microprocessor or a computer that is programmed to receive desired inputs and control the supplemental heat source 36 accordingly. In this example, the supplemental heat source 36 is connected with the electric grid 50 such that when the controller 52 activates the supplemental heat source 36, the supplemental heat source 36 draws power from the electric grid 50.

Depending on system factors and the type of working fluid 26 that are used, the first storage unit 32a operates in one example at a temperature of approximately 1100-1800° F. (approximately 593-982° C.). The second storage unit 32b operates at temperatures of as low as about 500° F. (260° C.). The system 20 and operation described here can also utilize lower operating temperatures; however, this will typically result in lower operating efficiency of the power block 40 and lower total energy capacity of the working fluid 26.

In operation of system 20, the working fluid 26 is heated within the solar receiver 24 and circulated into the first storage unit 32a. Pumps (not shown) are used to circulate the working fluid 26 through the lines 28 or other type of conduits. The working fluid 26 can be temporarily held in the first storage unit 32a or circulated into/from the storage unit 32a, depending on the operational state of the power block 40. Thus, the working fluid 26 generally is circulated through the first storage unit 32a when the power block 40 is in operation, although the circulation may or may not be continuous.

The working fluid 26 circulates from the first storage unit 32a to the power block 40 for generating electricity. The heated working fluid 26 flows through the heat exchanger 46 to heat the second working fluid, which in this example is water/steam. The steam from the heat exchanger 46 drives the high pressure turbine section 42a, which is coupled to drive the generator 44. The steam then returns to the heat exchanger 46 to be reheated. The reheated steam then drives the low pressure turbine section 42b, which is also coupled to drive the generator 44. The steam is then condensed in the condenser 48 before returning to the heat exchanger 46 for another cycle.

After flowing through the heat exchanger 46, the working fluid flows to the second storage unit 32b. The relatively cooler working fluid 26 may then be circulated from the second storage unit 32b to the solar receiver 24 for another cycle of use. As can be appreciated, other components may be used in combination with the illustrated components to facilitate or enhance operation of the solar power system 20.

FIG. 2 shows an example method 60 for use with a solar power system, such as solar power system 20. The method 60 will be described with reference to system 20 but it is to be understood that the method 60 is not necessarily limited to the illustrated configuration of system 20.

The method 60 includes solar heating step 62 and electric heating step 64. In the solar heating step 62, the working fluid 26 is heated using solar energy 22, as described above. As described, the solar energy 22 that is input into the working fluid 26 can be strong, intermediate, or poor and thus fluctuates depending upon the weather conditions. The strength of the solar energy 22 is represented by the temperature to which the solar energy 22 heats the working fluid 26. A predetermined threshold temperature above the freezing point of the working fluid 26 is set. For example, the predetermined threshold temperature is set according to a minimum desired total energy output from the system 20 and/or to reduce power output fluctuation to within a desired level.

In the electric heating step 64, the working fluid 26 is selectively electrically heated using the supplemental heat source 36 in response to the temperature of the working fluid 26 falling below the predetermined threshold temperature. The "selective" heating refers to an intelligent system that has the ability to consider various factors and determine whether or not, and in some examples when, to electrically heat the working fluid 26 in response to the temperature falling below the threshold temperature.

As an example, to reduce fluctuation in the power output from the system 20 and to maintain a desired power output, a predetermined threshold temperature of 800° F./427° C. can be set. In other examples, the threshold temperature can be different. If over a period of time the solar energy 22 is unable to maintain the working fluid 26 above the threshold temperature, the controller 52 can activate the supplemental heat source 36 to increase the temperature of the working fluid 26. In one example, the controller 52 activates the supplemental heat source 36 such that the working fluid 26 is maintained at the threshold temperature. In other examples, the controller 52 activates the supplemental heat source 36 such that the working fluid 26 is heated to the maximum operational temperature, or alternatively to an intermediate temperature between the threshold temperature and the maximum operational temperature. By maintaining the temperature of the working fluid 26 at or above the threshold temperature, there is less fluctuation in the power output from the system 20 and the power output is more predictable.

In further examples, in response to the temperature of the working fluid 26 falling below the threshold temperature, the controller 52 considers outside factors to determine whether to electrically heat the working fluid 26.

In one example, the controller 52 is provided with weather information or data to determine whether to electrically heat the working fluid 26. For instance, if the temperature of the working fluid 26 falls below the threshold temperature but the weather information suggests that the solar energy 22 is increasing in strength, the controller 52 decides not to electrically heat the working fluid 26. Alternatively, if the temperature of the working fluid 26 falls below the threshold temperature but the weather information suggests that the solar energy 22 is decreasing in strength, the controller 52 decides to electrically heat the working fluid 26.

In a further example, the controller 52 is provided with data about the electric grid 50 to determine whether to electrically heat the working fluid 26. For instance, if the temperature of the working fluid 26 falls below the threshold temperature but the data about the electric grid 50 is unfavorable (e.g., economically), the controller 52 decides not to electrically heat the working fluid 26. Alternatively, if the temperature of the working fluid 26 falls below the threshold temperature but the data about the electric grid 50 is favorable, the controller 52 decides to electrically heat the working fluid 26.

In some examples, the data about the electric grid 50 includes one or more of the price of electrical power from the electric grid 50, the price of electrical power delivered to the electric grid 50, a level of electric power demand on the electric grid 50, and a level of electric power supply to the electric grid 50.

Figure 3:
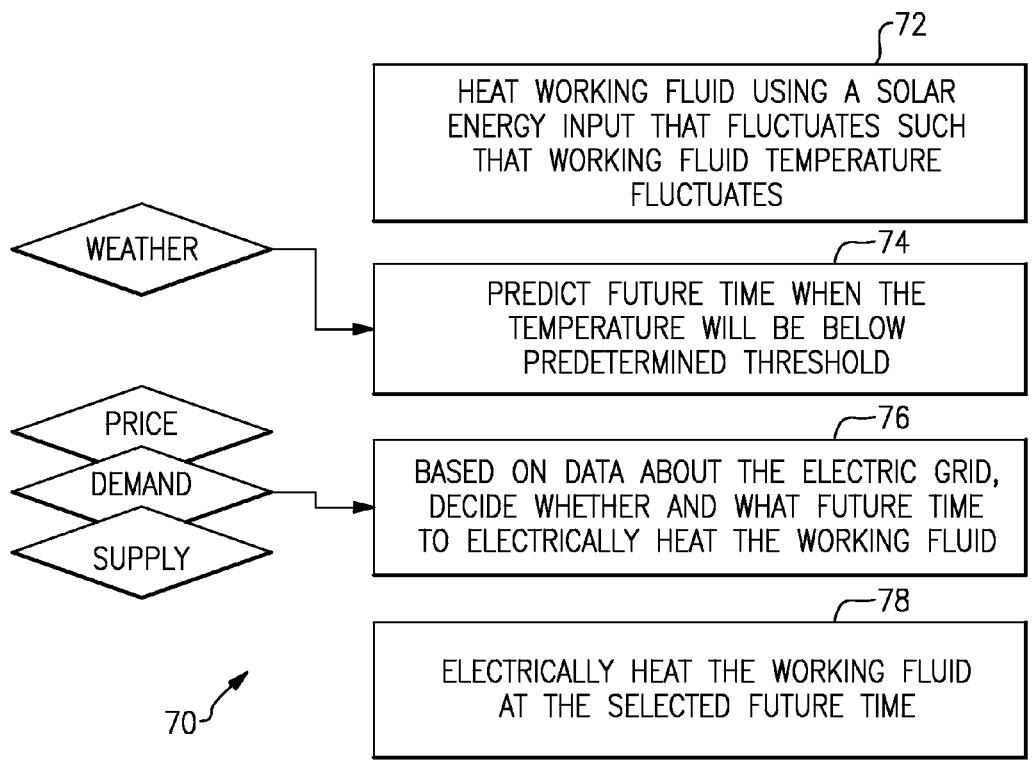
FIG. 3 shows another example method for use with a solar power system.

FIG. 3 shows another example method 70 for use with a solar power system, such as solar power system 20. Similar to the method 60, the method 70 will be described with reference to system 20 but it is to be understood that the method 70 is not necessarily limited to the configuration of system 20.

The method 70 generally includes a solar heating step 72, a prediction step 74, a decision step 76 and an electric heating step 78. The solar heating step 72 is similar to the solar heating step 62 described above.

At the prediction step 74, the controller 52 predicts a future time when the temperature of the working fluid 26 will be below the predetermined threshold temperature. In one example, the controller 52 is provided with forecast weather information or data for a period of time into the future, such as hours, days or weeks, as a basis for the prediction. Based on the weather information, the controller 52 estimates a future time when the solar energy 22 will be insufficient to maintain the temperature of the working fluid 26 above the predetermined threshold temperature, given the known thermal capacity of the working fluid 26 and system 20.

At the decision step 76, the controller 52 decides whether and at what future time to electrically heat the working fluid 26 based on provided data about the electric grid 50. As described above, the controller 52 can be provided with data such as estimates of the price of electrical power to and from the electric grid 50 at the predicted future time, a level of electric power demand on the electric grid 50 at the predicted future time, and a level of electric power supply to the electric grid 50 at the predicted future time.

In one example, the decision of whether to electrically heat the working fluid 26 is based on the price of electrical power from the electric grid 50 at the predicted future time. If the price is high, such as during the day, the controller 52 decides not to electrically heat the working fluid 26. On the other hand, if the price is low, such as during the night, the controller 52 may decide to electrically heat the working fluid 26 at a future time. This future time when the heating occurs may be the same as the predicted future time when the temperature of the working fluid 26 will be below the predetermined threshold temperature; however, it may be at an even later time when the price of electrical power from the electric grid 50 is even more favorable (i.e., less expensive).

In another example, the decision of whether to electrically heat the working fluid 26 is based on the overall supply and/or demand of electric power on the electric grid 50 at a predicted future period of time, which is typically during the peak electrical demand period of the following day. If it is forecast that there will be a relatively high supply and low demand, such as a moderate temperature day, the controller 52 decides not to electrically heat the working fluid 26. On the other hand, if it is forecast that there will be a relatively low supply and high demand, such as an especially hot day, the controller 52 decides to electrically heat the working fluid 26. Preferably, this heating is completed during a period when the price of electrical power from the electric grid 50 is at a minimum (i.e., at night).

If the controller 52 decides to electrically heat the working fluid 26, the controller 52 then activates the supplemental heat source 36 during the desired period to heat the working fluid 26.

In a further example, the decision of whether to electrically heat the working fluid 26 is based on a balance between the price of electrical power from the electric grid 50 during the heating period (step 64 or 78), the overall supply and demand of electric power on the electric grid 50 at the predicted future time, and/or the price of electrical power supplied to the electric grid 50 at a future time and the round-trip efficiency of the system 20 with regard to the amount of electrical energy input into the heater versus the amount of electrical output from the system due the input electrical energy.

In addition to or instead of the above-described control strategies, the system 20 can be utilized for electric energy storage when it is economically advantageous, for example. For instance, if the working fluid 26 has remaining capacity to be heated, the controller 52 can electrically heat the working fluid 26. In a further example, the system 20 can be used to store negative-cost electricity from the electric grid 50. As an example, if demand is low at night and there is a surplus of electricity during that time the cost of electricity delivered from the grid can be negative, such as when the wind is especially strong at night in a region with a large number of wind turbines. The controller 52 can be provided with the negative cost information and electrically heat the working fluid 26 in response if the working fluid 26 has thermal capacity. If the working fluid 26 has little or no thermal capacity, the controller 52 can circulate the working fluid 26 through the system 20 to reduce the temperature and then continue to electrically heat the working fluid 26 with the negative-cost electricity from the electric grid 50.

In addition to or instead of the above-described control strategies, the system 20 can be utilized to maintain electric output when portions of the system 20 are inoperative or shut down for maintenance. For example, if all or part of the solar receiver 24 and/or solar collectors 30 are inoperative or shut down for maintenance, the controller 52 can activate the supplemental heat source 36 to maintain the working fluid 26 above the threshold temperature and thereby maintain electrical output from the system 20. Thus, the supplemental heat source 36 further reduces or eliminates the need for an expensive reserve power plant.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A method of storing solar energy using molten salt to heat a working fluid for the generation of electricity and using a supplemental heat source to selectively augment the energy stored in the molten salt according to conditions, the method comprising:

(a) using solar energy to heat the molten salt to a thermal storage temperature at or above a predetermined thermal storage threshold temperature above the freezing point of the molten salt and according to a desired total energy output;

(b) using the supplemental heat source to selectively augment heating of the molten salt by transferring heat to the molten salt using electricity; comprising the steps of:

(i) using weather forecast information to predict a future time when solar energy will decrease in strength and the thermal storage temperature of the molten salt will fluctuate below the predetermined thermal storage threshold temperature;

(ii) using electric grid data to provide a determination whether and when to use the supplemental heat source to selectively augment the heating of the molten salt at the future time, wherein the electric grid data includes at least one of a predicted future electric power demand on the electric grid, a predicted future electric power supply to the electric grid, an electric power price, and negative-cost electricity data;

(iii) using the determination, at the future time, to cause the supplemental heat source to selectively augment the heating of the molten salt to a thermal storage temperature at or above the predetermined thermal storage threshold temperature;

(c) using the heated molten salt to heat a working fluid using a heat exchanger; and (d) using the heated working fluid to generate electricity using a turbine.

2. The method of claim 1, wherein step b(ii) comprises using the weather information to cause electrical energy to selectively augment the heating of the molten salt as a supplement to heating the molten salt with solar energy to maintain the molten salt at or above the predetermined thermal storage threshold temperature.

3. A solar power system for storing solar energy using molten salt to heat a working fluid for the generation of electricity and using a supplemental heat source to selectively augment the energy stored in the molten salt according to conditions, comprising:

a solar receiver;

at least one solar collector that directs solar energy toward the solar receiver the molten salt that is heated by the solar energy directed at the receiver to heat the molten salt at or above a predetermined thermal storage threshold temperature above the freezing point of the molten salt and according to a desired total energy output;

the supplemental heat source coupled to an electric grid and controllable to selectively augment heating of the molten salt in response to at least one of electric grid data, weather information, and a combination thereof;

the working fluid that is heated by the molten salt using a heat exchanger;

a turbine operable to generate electricity using the working fluid heated by the molten salt; and a controller that controls the supplemental heat source to selectively augment the heating of the molten salt, wherein:

the controller uses weather forecast information to predict a future time when solar energy will decrease in strength and the thermal storage temperature of the molten salt will fluctuate below the predetermined thermal storage threshold temperature;

the controller uses the electric grid data to provide a determination whether and when to use the supplemental heat source to selectively augment the heating of the molten salt at the future time, wherein the electric grid data includes at least one of a predicted future electric power demand on the electric grid, a predicted future electric power supply to the electric grid, an electric power price, and negative-cost electricity data; and the controller uses the determination to cause the supplemental heat source to selectively augment the heating of the molten salt at the future time to a temperature at or above the predetermined thermal storage threshold temperature.

4. The solar power system as recited in claim 3, further comprising at least one storage unit to receive the molten salt.

5. The solar power system as recited in claim 4, wherein the storage unit comprises a heater.

6. The solar power system as recited in claim 3, wherein the controller further uses the weather forecast information to provide a determination whether and when to use the supplemental heat source to selectively augment the heating of the molten salt at the future time.

* * * * *